(12) United States Patent
Ramsey et al.

(10) Patent No.: US 11,418,683 B1
(45) Date of Patent: Aug. 16, 2022

(54) SYSTEM AND METHOD FOR DEFINING COLORANT VALUES FOR PRINTING ON COLORED PRINT MEDIA

(71) Applicant: Xerox Corporation, Norwalk, CT (US)

(72) Inventors: Frederick J. Ramsey, Webster, NY (US); Thomas L. Pierce, Rochester, NY (US); Elizabeth Crossen, Churchville, NY (US); Clara Cuciurean-Zapan, Fairport, NY (US); Deepthi Sidavanahalli Rao, Lake Oswego, OR (US); Alan K. Robertson, Rochester, NY (US); David St. John, Rochester, NY (US); Jeremy Griffith, East Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/375,647

(22) Filed: Jul. 14, 2021

(51) Int. Cl.
| | |
|---|---|
| H04N 1/60 | (2006.01) |
| G06K 15/02 | (2006.01) |
| H04N 1/23 | (2006.01) |
| H04N 1/00 | (2006.01) |
| H04N 1/54 | (2006.01) |
| B41J 2/175 | (2006.01) |
| B41J 2/21 | (2006.01) |

(52) U.S. Cl.
CPC ........ *H04N 1/6025* (2013.01); *B41J 2/17593* (2013.01); *B41J 2/2117* (2013.01); *G06K 15/181* (2013.01); *G06K 15/1825* (2013.01); *G06K 15/1868* (2013.01); *H04N 1/0044* (2013.01); *H04N 1/00413* (2013.01); *H04N 1/2323* (2013.01); *H04N 1/2338* (2013.01); *H04N 1/2353* (2013.01); *H04N 1/2392* (2013.01); *H04N 1/54* (2013.01); *H04N 1/6008* (2013.01); *H04N 1/6097* (2013.01)

(58) Field of Classification Search
CPC .. H04N 1/6097; H04N 1/2323; H04N 1/2353; G06K 15/1825; G06K 15/1868
See application file for complete search history.

(56) References Cited

U.S. PATENT DOCUMENTS

| | | | | |
|---|---|---|---|---|
| 8,125,688 | B2 * | 2/2012 | Watanabe | ................ H04N 1/54 |
| | | | | 358/1.9 |
| 9,942,446 | B2 * | 4/2018 | Fukuda | .................... H04N 1/54 |
| 11,283,968 | B2 * | 3/2022 | Tajima | ................ H04N 1/6008 |

(Continued)

OTHER PUBLICATIONS

U.S. Appl. No. 17/360,104, filed Jun. 28, 2021, Rao, et al.

*Primary Examiner* — Scott A Rogers
(74) *Attorney, Agent, or Firm* — Fay Sharpe LLP

(57) ABSTRACT

An image processing system and method provide for receiving a digital document page to be printed. The page includes a background region for which no color is specified. A user is presented with an option to select a print medium from a set of print media of different colors and to select an option for a color of the selected print medium be used as a color of a background layer of the digital document page. When the option is selected, a background layer is inserted into the page. A print job incorporating the processed digital document page is output to an associated printer that is configured to convert the color of the background layer to colorant values that use the print media as a colorant for rendering at least a part of the background region.

22 Claims, 7 Drawing Sheets

(56) References Cited

U.S. PATENT DOCUMENTS

| | | |
|---|---|---|
| 2006/0250427 A1 | 11/2006 | Kroon et al. |
| 2010/0060682 A1* | 3/2010 | Akatsuka ............... B41J 2/2142 347/9 |
| 2020/0128150 A1 | 4/2020 | Iwaki et al. |

* cited by examiner

SYSTEM AND METHOD FOR DEFINING COLORANT VALUES FOR PRINTING ON COLORED PRINT MEDIA

CROSS REFERENCE TO RELATED PATENTS AND APPLICATIONS

Cross-reference is made to copending U.S. application Ser. No. 17/360,104, filed Jun. 28, 2021, entitled SYSTEM AND METHOD FOR PRINTING COLORED MEDIA WHEN INPUT COLOR MATCHES MEDIA COLOR, by Rao, et al., the disclosure of which is incorporated herein by reference in its entirety.

BACKGROUND

The exemplary embodiment relates to color printing and finds particular application in a system and method for defining colorant values for rendering a page image on colored print media which facilitates using the print media color as part of the printed image.

Color printers generally employ a set of colorants, such as inks or toners, to render images on print media, such as paper, transparent media, or fabric. When printing on colored media, a white colorant is often used an underlay to block the media color from showing through and to render white parts of a document. The colors in the printer's gamut are achieved with a mix of cyan, magenta, and yellow (C, M, and Y) colorants over the white (W) colorant. However, this can be costly, since white colorant is also applied to areas of the page which would normally be left blank.

Document creation applications often assume that documents will be printed on white paper, and that the printer will not apply colorant to white areas within the document. When a document creator wishes to use colored print media to render designs, it is difficult to express this intent. For example, a document creator may create a design on a "white" background, assuming this will be left blank when printed on colored print media. However, when the print job reaches the printer, the printer's software may recognize that the background should appear white, and thus apply a layer of white toner to mask the color of the print medium. This is both costly and does not achieve the designer's intent.

Additionally, the PostScript® language, which is the page description language often used to provide instructions to the printer, does not support transparency, unlike PDF. As a result, areas that appear to be fully transparent on the user's screen, are converted to solid white in the PostScript® document sent to the printer. To overcome this problem, one approach is to edit documents manually and assign a special "no-toner" color to all of the areas that should be left blank. This process may entail determining the RGB or CMYK values corresponding to the colored media to be used, then manually filling the background of each vector object in the document with that value. This is time consuming, and generally has to be repeated each time the media color is changed.

The exemplary embodiment provides a method for assisting a user in selecting a background color for pages of print jobs that are to be rendered on colored media.

INCORPORATION BY REFERENCE

The following references, the disclosures of which are incorporated herein by reference in their entireties, are mentioned:

U.S. Pub. No. 20060250427A1, published Nov. 9, 2006, entitled SYSTEMS AND METHODS THAT IMPROVE FLUID COLOR OUTPUT BY USING CLEAR OR WHITE FLUID, by Stephen M. Kroon, et al., describes an imaging system that forms an image using non-white, white, or clear ink at each pixel on a receiving medium.

U.S. Pub. No. 20200128150 A1, published Apr. 23, 2020, entitled INFORMATION PROCESSING DEVICE AND RECORDING MEDIUM, by Kaori Iwaki, et al., describes a color converter that converts color in an acquired image depending on a positional relationship between a white image forming section that forms an image on the medium with white color material and a color image forming section that forms an image on the medium with colored color material.

BRIEF DESCRIPTION

In accordance with one aspect of the exemplary embodiment, an image processing system includes a reception component, which receives a digital document page to be printed, the digital document page including a background region for which no color is specified. A background color selection component provides for a user to select a print medium from a set of print media of different colors and to select an option for a color of the selected print medium be used as a color of a background layer of the digital document page. When the option is selected, a color implementation component inserts the background layer into the digital document page to form a processed digital document page. An output component outputs a print job incorporating the processed digital document page to an associated printer that is configured to convert the color of the background layer to colorant values that use the print media as a colorant for rendering at least a part of the background region. A processor implements the reception components.

In accordance with another aspect of the exemplary embodiment, an image processing method includes receiving a digital document page to be printed, the digital document page including a background region for which no color is specified. An option for a user to select that a color of a selected print medium be used as a color of a background layer of the digital document page is provided. When the option is selected, the background layer is inserted into the digital document page to form a processed digital document page. A print job incorporating the processed digital document page is output to a printer that is configured to convert the color of the background layer to colorant values that use the print media as a colorant for rendering at least a part of the background region.

One or more steps of the method may be performed with a processor.

In accordance with another aspect of the exemplary embodiment, an image processing method includes receiving a digital document page to be printed, the digital document page including a background region for which no color is specified. A user's selection of a print media color to be used in rendering the digital document page is received. Provision is made for the user to select that a color of the selected print medium be used as a color of at least a part of a background layer of the digital document page. Optionally, provision is made for a user to select a foreground colorant to be applied over at least a part of the background layer. A processed digital document page is generated, including inserting a background layer into the digital document page with the color of the selected print medium. Colors of the digital document page are converted to colorant values used in printing, the conversion of the color of the selected print medium to colorant values resulting in no colorant being applied to the print medium in locations for which the color of the selected print medium is specified unless the user has selected a foreground colorant.

One or more steps of the method may be performed with a processor.

DETAILED DESCRIPTION

Figure 1:
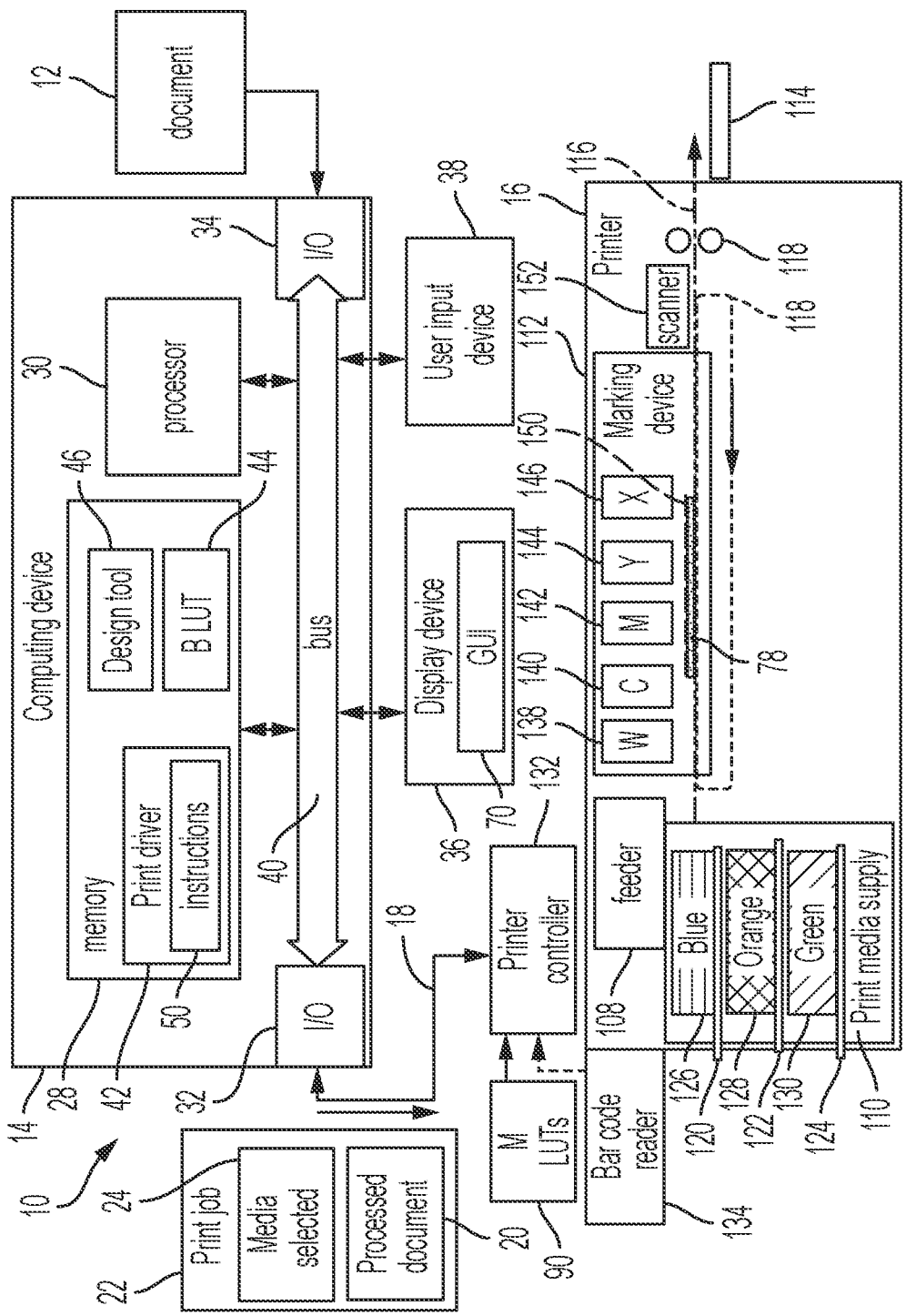
FIG. 1 is a functional block diagram of an image processing system in accordance with one aspect of the exemplary embodiment.

Aspects of the exemplary embodiment relate to a system and method for assisting users in creating a print job intended for printing a digital document on colored print media. The system and method are configured to insert a paper show-through color as a layer of the document. The inserted layer may be the lowest layer, i.e., the layer closest to the print media.

In one embodiment, the system allows a default background color to be selected. This allows acceptable results to be achieved on any colored media, without the user having to make specific print driver selections. The background color setting can be fine-tuned by a user to achieve adjusted results.

One advantage of the system and method is that manual adjustment of background colors of vector elements in a document are not required. Another advantage of the system and method is that adjustments can be readily implemented for printing on various media colors without needing to change the document each time the media color is changed.

As used herein, a "printer" can include any device for rendering an image on print media, using colorants, such as inks or toners. Example printers include laser printers, inkjet printers, offset printers, bookmaking machines, and multi-function machines, which provide printing as well as other functions, such as coping and faxing.

"Print media" can be any physical object suited for printing, such as a sheet of paper, plastic, fabric, or other suitable physical print media substrate for rendering a document.

"Colored print media" refers to non-white print media, which is colored or clear and is generally less reflective than the "white" print media commonly available for printing. In the case of colored print media, a set of standard colors of print media may be considered, such as at least two or at least three of red (dark/pink), orange, yellow, green (dark/light), blue (dark/light), purple, black, brown, and grey print media. In particular, in the CIELab color space, colored print media may meet at least one of: (1) an $L^*$ of less than 95, on a scale of 0-100, (2) an $a^*$ of greater than $\pm 10$ on a scale of $-127$ to $+127$, i.e., outside the range of $-10$ to $+10$, and (3) a $b^*$ of greater than $\pm 10$ on a scale of $-127$ to $+127$, i.e., outside the range of $-10$ to $+10$.

"White print media" generally refers to print media which is close to (100, 0, 0) in the CIELab color space, in particular, $L^*$ is at least 95, $a^*$ is in the range of $0\pm 10$, and $b^*$ is in the range of $0\pm 10$.

A "document" is normally a set of related sheets or electronic document pages, from a particular user, or otherwise related, although in some instances, a document may comprise a single sheet or image. Documents to be rendered on the print media by the printer may include digital information comprising images, graphics and/or text.

A "print job" includes one or more documents in a format suitable for processing by a printer and may include one or more page images which define the colors to be printed, e.g., as RGB or CMYK values, as well as printing instructions, in particular, the type of print media to be used in rendering each page image.

A "user" can be any person interacting with a print driver via a user interface.

With reference to FIG. 1, a functional block diagram of an image processing system 10 is shown. The system 10 is capable of receiving documents 12 to be printed and/or generating them within the system. The illustrated system 10 includes one or more computing devices 14, which communicatively connected with one or more printers 16, e.g., by a common network 18, such as a wired or wireless local area network (LAN) or wide area network (WAN), such as the Internet. The computing devices 14 (only one of which is illustrated) may be directly connected with the printer(s) 16 or may communicate with the printer via an intermediate network server (not shown).

The computing device 14 may be in the form of a conventional general purpose personal computer, such as a desktop, a laptop, palmtop computer, portable digital assistant (PDA), cellular telephone, pager, or other digital device with capability for processing input documents 12 and outputting processed documents 20 to the printer 16 in the form of a print job 22. The illustrated print job also includes instructions 24 to the printer, which may include a selection of a particular type of print medium, when more than one is available on the printer. For example, a user may specify one of a set of colored print media and/or white print media currently available on the printer.

The illustrated computing device 14 includes memory 28, a processor 30, and one or more input/output (I/O) interfaces 32, 34. The I/O interfaces serve to couple the computing device to other devices via the network 18, and can each be a modulator/demodulator (MODEM). Additional I/O devices (not shown) couple the computing device 14 to an associated display device 36, such as a color screen and/or audio device, and to a user interface device 38, such as a keyboard, keypad, cursor control device, touch screen, combination thereof, or the like for inputting instructions and for communicating user input information and command selections to the processor 30. Hardware components 28, 30, 32, 34 of the computing 14 device may all be communicatively connected by a system bus 40.

Memory 28 of the computing device 14 (and/or memory accessible to the computing device 14 via the network) stores a print driver 42, a background color identification table (LUT) 44 (or other data structure), which provides colorant values corresponding to a set of at least two, three, five, ten, or more common paper colors. Memory 28 may also store or provide access to one or more design tools 46 for document creation and/or modification. Example document creation applications include Microsoft Office, Microsoft Publisher, and the Adobe Creative Cloud suite.

The print driver 42 may be configured as for a conventional print driver except as noted. As with a conventional print driver, the illustrated print driver receives an input document 12 and user selections, converts the document to a printer-ready format, e.g., a page description language, such as the PostScript® language, and outputs the processed document 20 to a selected printer 16 as a print job 22.

Figure 2:
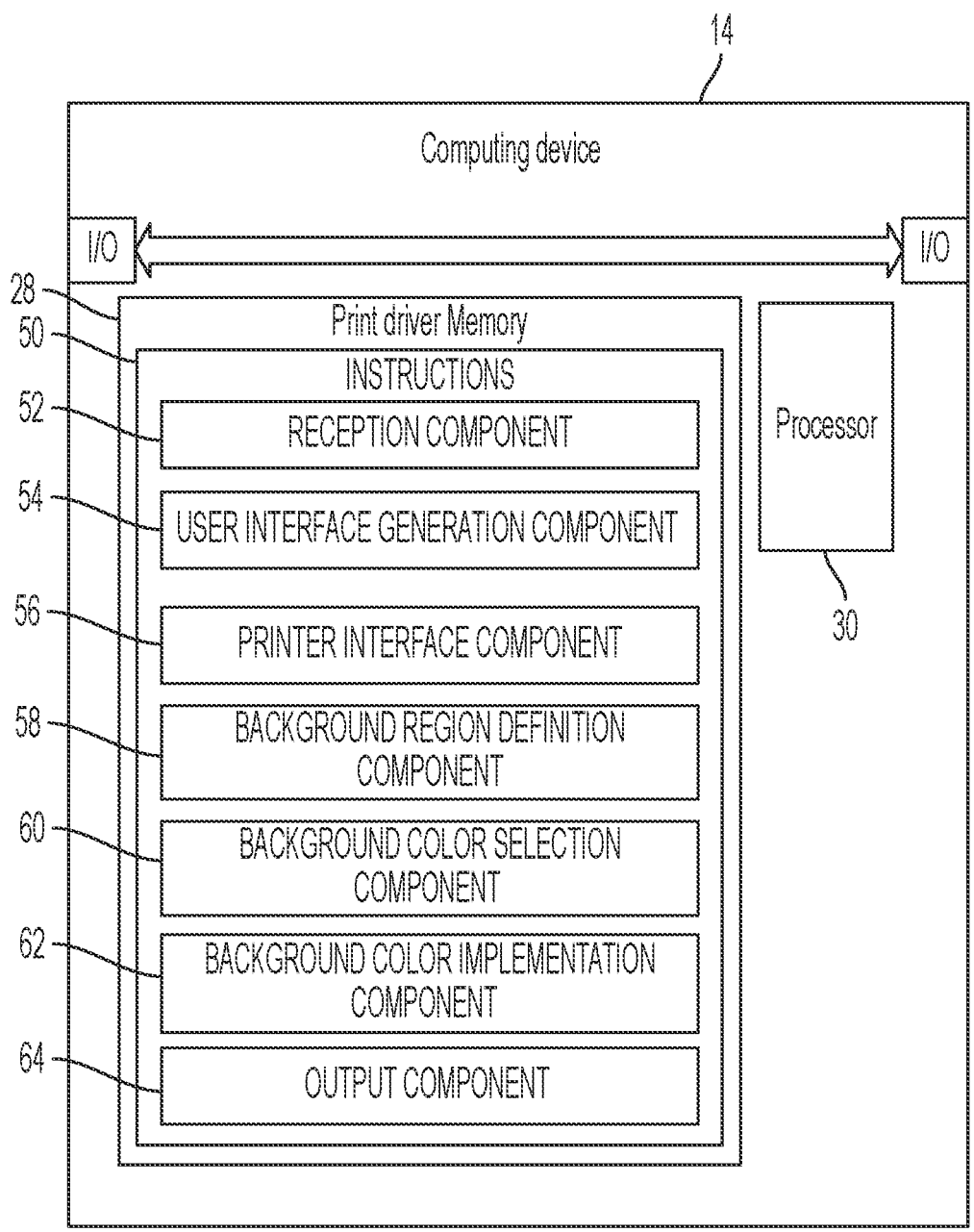
FIG. 2 illustrates an example print driver for the image processing system of FIG. 1.

As illustrated in FIG. 2, the print driver 42 includes software instructions 50 for implementing the exemplary method. For ease of reference, these instructions are described in terms of a reception component 52, a user interface generation component 54, a printer interface component 56, a background region definition component 58, a background color selection component 60, a color implementation component 62, and an output component 64.

Briefly, the reception component 52 identifies an input document 12 that a user has selected for printing, e.g., by the user tapping or otherwise actuating a print icon on the display. The reception component 52 may store the selected document in a predefined memory location, such as in memory 30, during processing by the print driver. As an example, in the case of Windows®, when instructed to print, the document creation application transmits the input document to the print driver in an intermediate format. Then, the print driver converts that to PostScript®.

The user interface generation component 54 generates a graphical user interface (GUI) 70 for display to the user on the display device 36, which gives the user an option to select a background layer color suitable for the print media selected for printing. The GUI 70 may be displayed automatically when the user has actuated the "print" function.

The optional printer interface component 56 communicates with the printer 16 to obtain information on the types of print media available for printing. The printer interface component 56 may store information on the currently available print media types in memory 28 accessible to the generation component 54.

Figure 3:
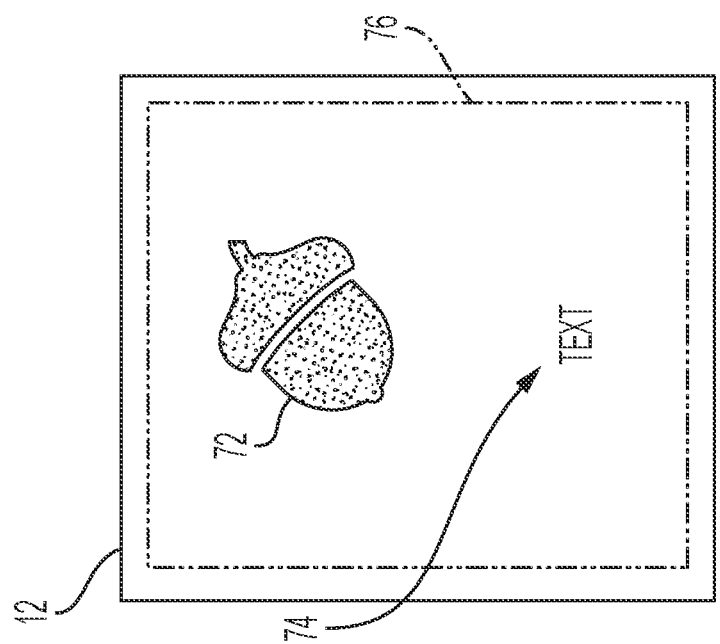
FIG. 3 illustrates an example document created with vector graphics.

The background region definition component 58 identifies a region of each document page which should be considered as a background region 76. For example, assume that a user has created a document 12 as shown in FIG. 3, which includes a graphical object 72 and some text 74. The remainder of the document has been left blank by the user. The background region 76 is selected to encompass all the objects 72, 74, that the user has incorporated in the document 12. In some cases, a standard sized background region 76 may be selected.

Figure 4:
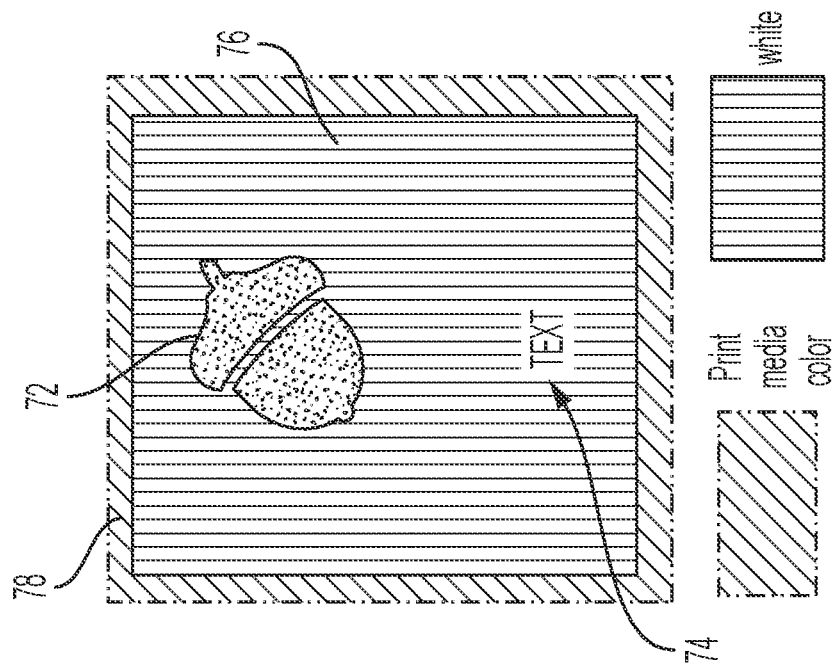
FIG. 4 illustrates printed non-white media generated from the document of FIG. 3 using a printer configured for applying a white colorant, in addition to other colorant(s)

A conventional print driver would interpret the blank area as "white" and would send a white value (e.g., (0,0,0) in RGB space) to the printer 16. FIG. 4 illustrates the result which would be achieved in a printer having several colorants including white. As can be seen, in the conventional method, the printer 16 creates a layer of white colorant in the background region 76, which in this case occupies most (or all) of the area of the colored print medium 78.

Figure 5:
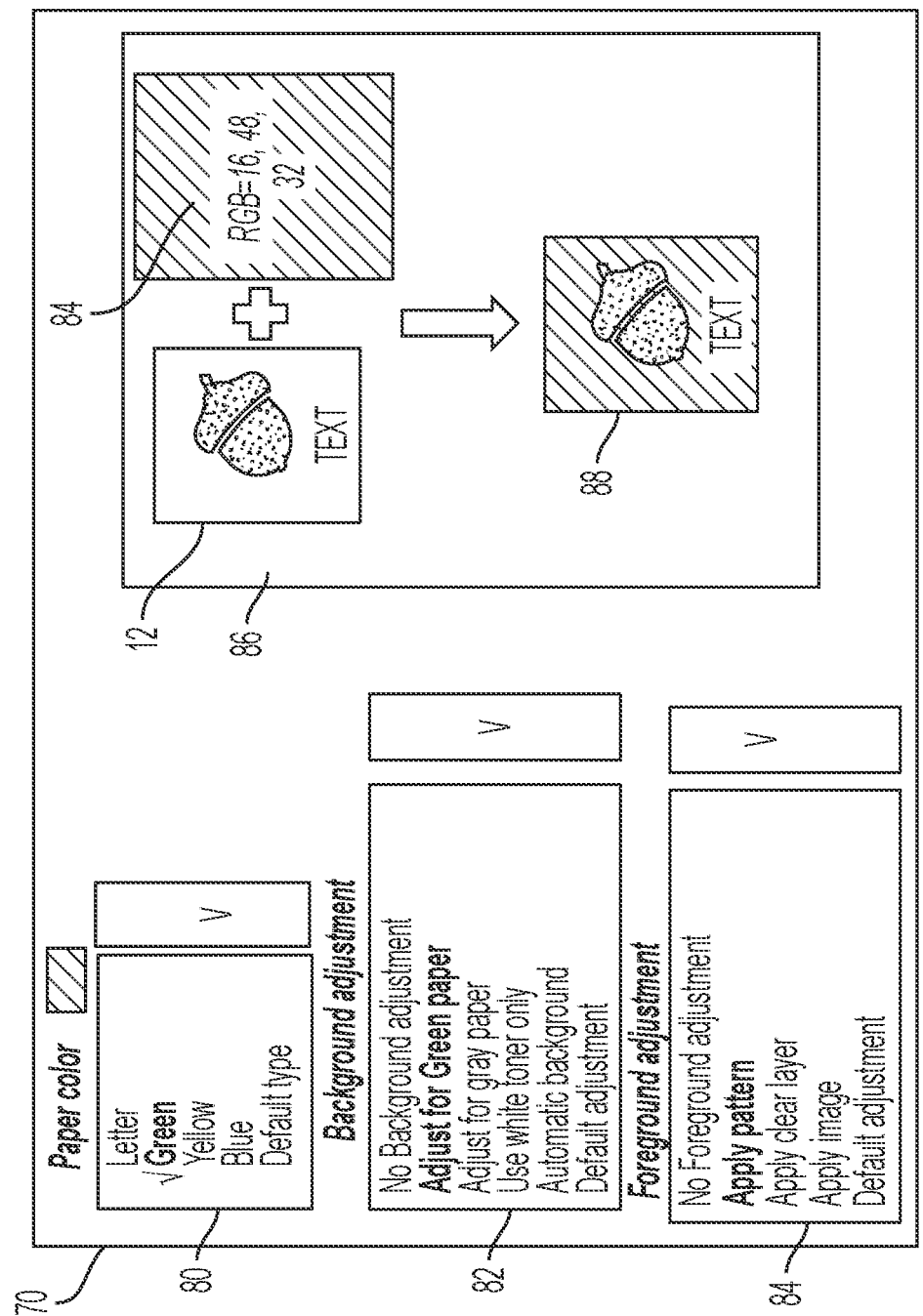
FIG. 5 illustrates a print driver graphical user interface for specifying a print media color.

In the present system 10, the background color selection component 60 provides the user with the option to use the print media color as the background color. For example, as illustrated in FIG. 5, the user is presented, through the GUI 70, with the option to select a print media type, as illustrated in the scrollable menu 80. In the case of non-white print media, the print media types may be identified by the common name of the print media color in a natural language, such as English, e.g., "blue" or "green". Additionally, or alternatively, the print media colors may be represented by colored patches. In one embodiment, the selection may be limited to the print media types currently available on the printer 16. In this embodiment, it is assumed that the printer, or other device connected with the printer, has provided this information to the printer interface component 56 of the print driver. Alternatively, or as a selectable option, a larger number of print media types may be displayed, with the user being prompted, by the print driver or printer, to install the selected type in the printer, if unavailable at the time of printing.

Given the user's selection of print media type (green paper in this example), the GUI 70 provides the option to automatically adjust the background region color, e.g., based on the print media selection. In the illustrated example, in FIG. 5, the user is provided with a set of background color options via a scrollable menu 82. At least one of the options allows the user to select the same background color as that of the selected print media. For example, the user clicks on the option "adjust for green paper" (or a generic option, "adjust for print media color") to use the print media itself as the background color.

In the illustrated menu 82, the options are limited, to some extent, by the user's paper selection in menu 80. In other embodiments, the options are not so limited. For example, the menu could also display "adjust for yellow paper," and the like, even when the user has selected a green color of print media. Other options may include one or more of a "default adjustment" option, a "no background adjustment" option, "use white toner only," "adjust for gray paper," "automatic background," "no background fill," and the like. For example, the menu 82 could include the following options: Adjust For Gray Paper; Automatic Background; No Background adjustment; Use White Toner Only; Adjust for Gray Paper; Adjust for Black Paper; Adjust for White Paper; Adjust for Blue Paper; Adjust for Yellow Paper; Adjust for Green Paper; Adjust for Pink Paper; Adjust for Red Paper; Adjust for Orange Paper; Adjust for Purple Paper; Adjust for Brown Paper; Adjust for Cyan Paper; Automatic Background; No Background; and the like.

The "default adjustment" option may be selected by the user or implemented by default, if the user does not make a paper color selection, and may automatically implement one of the other adjustment options, or a different adjustment option. For example, the default setting may be to "adjust for gray paper." Although this may not be optimal for all media colors, it can produce acceptable results on a variety of colored media.

The "no background adjustment" option causes the selection of "white" for the background, which on colored media, results in creation of a white background, assuming that white colorant is available on the printer.

The "use white toner only" option instructs the printer to print white toner only, in reverse grayscale. The printer replaces black areas of the document with white toner. White areas of the document print with no toner.

The "automatic background" option creates a background automatically that corresponds to the paper color selected.

Where there are no design elements and a transparent background, the paper is unmarked. In one embodiment, his option is selected by default.

The "no background fill" option disables the "automatic background" feature, allowing advanced users more freedom of design. This allows a user to add a background manually.

Figure 6:
FIG. 6 illustrates an exemplary color table for a set of print media colors.

The color implementation component 62 automatically inserts a background layer 84 (e.g., a large rectangular vector object filled with the background color) as the first color layer of the document page (or last layer, in the case of offset printing, where the layers of colorant are inverted), as appropriate. For example, if "green" is selected as the background color, either by a user or by default, the implementation component 62 accesses the pre-generated LUT 44 to retrieve appropriate color separation values in a selected color space. FIG. 6 shows an illustrative LUT 44 with color separation values in both RGB and CMYK color spaces, for a set of different paper colors. For accuracy, the values may be determined on sheets of the print media using a spectrophotometer, and/or provided by the printer 16. For example, if the document is created using the CMYK color space to define colors, the implementation component 62 uses the "green" CMYK color separation values (85, 50, 70, 50) for creating a background layer 84 in a document to be printed on green print media 78. In one embodiment, the background layer 84 is at least as large as the digital document page, such that it fills the printed page.

As an example, the PostScript® instructions that the driver inserts to implement the background layer 84 when the user selects "Adjust for Black Paper" may be as follows:
% X Background Fill begin
0 0 moveto
0 1500 rlineto
1500 0 rlineto
0-1500 rlineto
closepath
0 0 0 1 setcmykcolor fill
% X Background Fill end The print driver inserts it near the beginning of page setup for each page. As will be appreciated, other methods of implementing the background layer are also contemplated.

Figure 8:
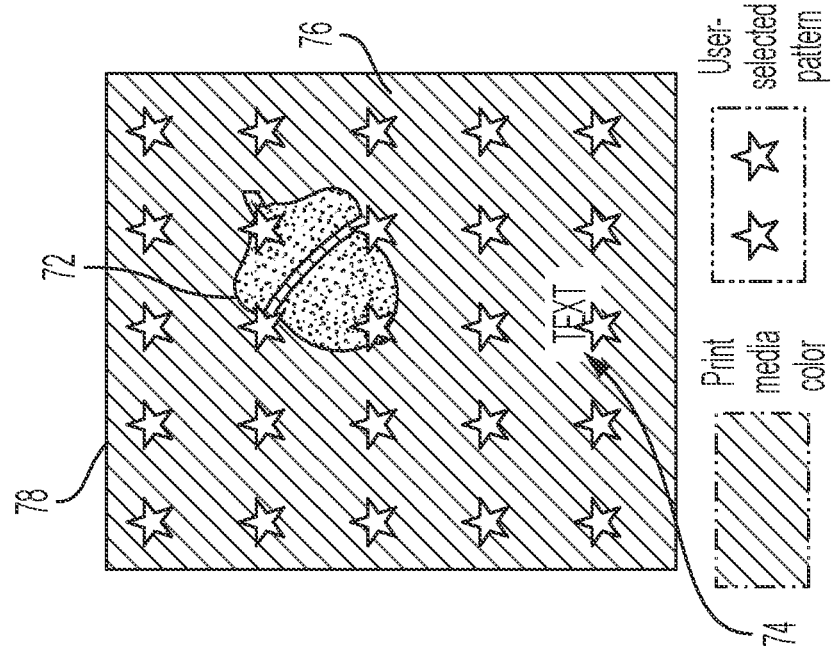
FIG. 8 illustrates printed non-white media generated from the document of FIG. 3 using a printer configured for applying a white colorant, in addition to other colorant(s), when a pattern incorporating the print media color has been specified for a background region.

In one embodiment, the print driver 42 is configured to add a foreground layer to the PostScript output 20. Similar to the background layer definition, the user, through the user interface, may select a foreground pattern, texture, or other foreground colorant to be used throughout the region 76. For example, as illustrated in FIG. 5, a menu 84 allows a user to select a pattern, a clear layer, an image, or other feature to be printed in the region 76. If the user selects "apply pattern" a further menu may open which allows the user to select from various patterns, each of which use the print media color to create part of the pattern. A pattern-filled foreground layer could add a subtle visual effect, using less colorant than a completely filled-in foreground, as illustrated, for example, in FIG. 8. In this case, the user has selected to apply a dot pattern as a foreground layer in the background region 76.

If the user selects "apply clear layer," the print driver recognizes that clear toner or ink should be applied as a foreground colorant to form the foreground layer. A solid layer can thus be used to produce a varnish-like effect. Selecting "apply image" could be used to add a watermark-like effect, where at least a part of the image is provided by the print media color. The foreground layer can be implemented in a similar manner to the background layer, by the color implementation component 60, through suitable code.

In one embodiment, the UI generation component 54 causes the GUI 70 to display a preview 86 of the print job when printed, e.g., in the colors selected by the user. In the illustrated preview 86, the user's document 12 and background layer (and any foreground layer) are represented as well as the combination of the layers, as shown at 88. As will be appreciated, in the representation, the colors of the user's document and background layer may not accurately match those the printed document, and may be at a different (e.g., reduced) pixel resolution, but should be adequate.

In one embodiment, the user can click on or otherwise actuate the representation of the background layer 76, which causes it to switch to another of the print media colors.

Figure 7:
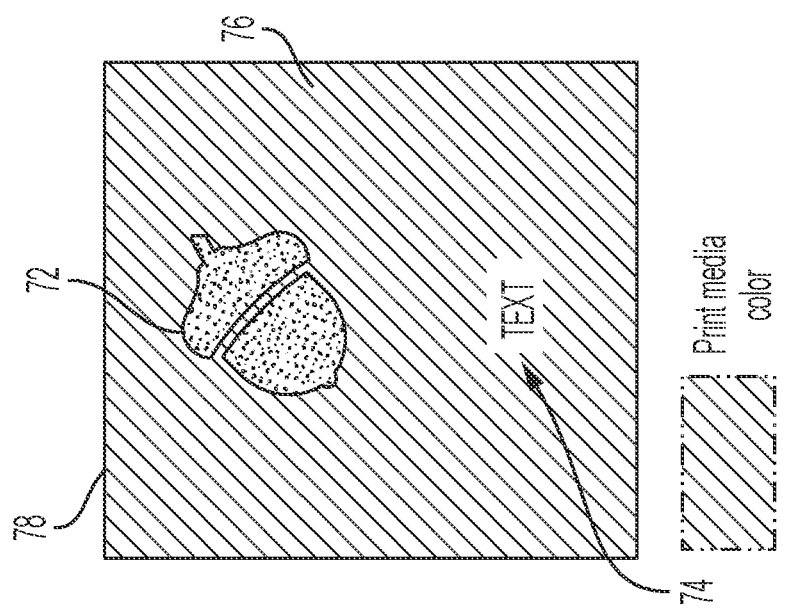
FIG. 7 illustrates printed non-white media generated from the document of FIG. 3 using a printer configured for applying a white colorant, in addition to other colorant(s), when the print media color has been specified for a background region.

The output component 64 outputs the print job, including the processed document 20 with the background layer 84 specified, to the printer 16. The printer is configured to convert the color of the background layer 76 to colorant values that use the print media 78 as a colorant for rendering at least a part of the background region, e.g., alone or with a pattern and/or clear coat. To achieve the conversion, the printer may be provided with access to a set of multidimensional color conversion tables (MLUT) 90, one for each of the paper colors. For each MLUT, the color closest to the selected (or default) paper color is converted to "no colorant". Thus, for example, in the green paper MLUT, the input color (85, 50, 70, 50) is converted to an output color of (0, 0, 0, 0) in a CMYW color space. As a result, no colorant is applied in the background region, allowing the print media to provide the green background color, as illustrated in FIG. 7.

With continued reference to FIG. 1, the illustrated printer 16 includes a feeder 108, a print media supply 110, one or more marking devices 112, and an output device 114, which are connected by a sheet transport path 116. Print media sheets 78 are fed from the supply 110 by the feeder 108 and conveyed from the print media supply 110 in a downstream direction along the transport path 116 to the one or more marking devices 112, and ultimately to the output device 114, by a sheet conveyor system 118, composed of rollers, conveyor belts, air jets, combinations thereof, or the like. For duplex printing, the sheet transport path 116 may include a return path which returns sheets 78 that have been printed on a first side to the marking device for printing on the second side. Alternatively, a second marking device, downstream from the first, prints the second side.

The print media supply 110 may include a set of trays 120, 122, 124, etc. which each hold a stack 126, 128, 130 of sheets 78. In the illustrated embodiment, one or more of the stacks may consist of non-white sheets 78, such as the blue, orange, and green sheets illustrated. A printer controller 132 stores in local memory, or otherwise has access to, the color of the sheets in each tray 120, 122, 124. For example, a bar code reader 134 is positioned to read a bar code, or other identifier, on the print media packaging, which identifies the type of print media being placed in an open tray, including its color, e.g., defined in a color space such as RGB or CMYK. The reader 134 is in communication with the printer controller 132.

The printer controller 132 has access to the set of multidimensional lookup tables (MLUTs) 90 for converting input color separation values, specified in a print job, to output colorant values for each of the colorants currently used in the printer. For example, the illustrated marking device includes five colorant sources 138, 140, 142, 144, 146, although fewer or more colorant sources may be used. Each colorant source stores a respective colorant, e.g., in the form of ink or toner particles, to be used in rendering print jobs. Colorant source 138 holds white colorant, white the other colorant sources 140, 142, 144, 146 hold non-white colorants, such as cyan, magenta, yellow, and optionally another colorant (denoted by X), such as black, or a custom colorant, or may be configured to apply a non-colorant clear coat. In an exemplary embodiment, each of the MLUTs 90 in the set is specific to a respective one of the print media colors. Thus, for eleven standard print media colors (gray, black, white, yellow, green, pink, red, orange, purple, brown, and cyan), eleven MLUTs 90 may be provided.

The printer controller 132 receives a print job 22 to be printed by the printer and accesses the information 24 on the selected print media. When the print job specifies colored media, e.g., by specifying one of a set of print media colors, such as "orange," the printer controller 132 accesses the MLUT 90 which is adapted for use when printing orange print media. In one embodiment, when none of the MLUTs 90 corresponds to the user-selected print media color, an MLUT 90 for the closest available color, or gray, may be selected.

Each MLUT 90 converts the color separation values for the respective media color to no colorant values. For example, the MLUT 90 for use with orange print media converts an RGB input of (255, 160, 96) for a pixel (corresponding to the color of the print media) to (0, 0, 0, 0, 0) in the five-colorant example of FIG. 1. Accordingly, the print media color shows through for those pixels. In another embodiment, where one of the sources provide a clear (substantially transparent) "colorant," a colorant value may be specified to provide a sheen to the print media in the areas with no colored colorant. For example, the MLUT may output (0, 0, 0, 0, 100) in the five-colorant example of FIG. 1, where colorant source 146 contains clear toner.

Each MLUT 90 may be configured to use the print media colorant, in combination with colorant layers, to form selected output colors. For example, colors that are close to orange, in the case of orange print media, may be formed by applying colorants as small dots over the print medium, such that the region appears to the human eye to be a single uniform color.

When "no background adjustment" is selected, the printer controller uses a predefined LUT with no adjustment for media color or white toner. The printer replaces black toner areas with white toner.

In another embodiment, some of the operations described herein as being performed by the print driver 42 may be performed on the output print job 22 by the printer controller 132, or by an intermediate print server, to achieve the same result. For example, the print driver may add a command in the job header 24 of the print job 22 to instruct the printer to adjust for a specific print media color. In this embodiment, the printer controller 132 may automatically insert the background layer before passing the job to the PostScript® interpreter.

The marking device(s) 112 apply images 150 to print media, using the colorants. The marking devices may be laser (xerographic) or inkjet marking devices. In one embodiment, the marking device 112 is an inkjet marking device, which applies the colorants, in the form of liquid inks, to the print media as small droplets, which are ejected from a set of inkjet heads. The liquid inks may be water-based inks, which are dried (fixed) to the sheet with heat by a dryer downstream of the inkjet heads. Alternatively, or additionally, the inks may include a radiation curable material, which is cured (fixed) with radiation, such as UV, by a UV curing station, downstream of the inkjet heads.

In another embodiment, the marking device 112 is an electrophotographic (laser) marking device, which applies colorants in the form of different toners to the print media using a photoreceptor, which may be in the form of a belt or drum. The toners may be in the form of particles, which are fixed to the sheet with heat and/or pressure, e.g., by a dryer downstream of the photoreceptor.

In another embodiment, the marking device 112 is an offset marking device, which applies colorants, e.g., in the form of colored toners or inks, to a transfer member which transfers image to the print media.

Other types of marking device, and/or a combination of types of marking device, are also contemplated.

In one embodiment, a sensor system 152, such as one or more full width array scanners, is positioned to detect the color of one or more non-white print media to be used in printing. The detected color of the print media may be used to generate the MLUT 90 for that print media. For example, the output colorant values for the detected color are set to zero. This step may be performed offline or by an inline scanner. In one embodiment, the inline scanner 152 is positioned downstream of the marking device 112. In one embodiment, the scanner scans a pattern of different colorant combinations printed in patches on one or more sheets of non-white print media. The detected colors of the test patches are compared with input color separation values for the test patches to generate the MLUT 90 for respective print media.

The output device 114 may include one or more trays, positioned downstream of the marking device(s) 112 and optional sensor system 152. The trays collect the output the printed pages, e.g., as a stack of printed pages. As will be appreciated, the printer 16 may include additional components, such as one or more of a stacker, stapler, bookbinder, user interface, controller, and the like.

The memory 28 of the computing device 14 may represent any type of computer readable medium such as random access memory (RAM), read only memory (ROM), magnetic disk or tape, optical disk, flash memory, or holographic memory. In one embodiment, the memory 28 comprises a combination of random access memory and read only memory. In some embodiments, the processor 30 and memory 28 may be combined in a single chip.

The digital processor device 30 can be variously embodied, such as by a single-core processor, a dual-core processor (or more generally by a multiple-core processor), a digital processor and cooperating math coprocessor, a digital controller, or the like. The digital processor 30, in addition to executing print driver instructions 50 may also control the operation of the computer 14.

The term "software," or "instructions," as used herein, is intended to encompass any collection, or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary print driver 42 can be configured to support specific document generation applications. In the case of a print driver 42 using the PostScript® language, Windows® applications can use PostScript® print drivers in two different ways. The first approach, which is used by many common document creation applications such as Microsoft Office, utilizes the print driver to convert an intermediate format, for example Windows Graphics Display Interface (GDI) commands for drawing text, vector graphics, patterns, and raster images, to the corresponding PostScript® commands which can be processed by the printer device. The second approach is referred to as PostScript® passthrough. The application generates all or major portions of PostScript® instructions directly and "passes it through" the driver to the printer. The print driver still has the option of modifying the PostScript® instructions. However, the PostScript® language is a complex programming language, and document generation applications are free to generate arbitrarily complex PostScript® instructions. Accordingly, providing a method for adjusting the background color which can be used with many document generation applications is particularly useful.

In the case of PostScript® passthrough, some older applications generate virtually all of the PostScript® for the job in one unit and pass it to the print driver to send to the device. For these, additional modifications to the driver may be made. However, most current applications that perform passthrough cooperate with the print driver to set up and then draw the content for each page. This gives the driver an opportunity to safely adjust settings for each page and to apply transformations, such as rotation or scaling, to individual pages as a whole.

In the case of macOS® applications, PostScript® print drivers use the open-source CUPS (Common UNIX Printing System) print system which also supports both normal and PostScript® passthrough printing. macOS® applications require all print jobs to go through the CUPS filter chain. The normal case is similar to the approach used by Windows® applications in which the application draws a page and submits it to the print system, repeating until all pages have been submitted. In the passthrough case, macOS® applications generate all of the PostScript® instructions for the print job and submit that PostScript® file to the CUPS filter chain. The exemplary print driver serves as one filter in that chain. The print driver examines the PostScript® file as it comes through. It adds a job ticket and can make any necessary additions or changes to the PostScript® instructions.

The exemplary system and method enable insertion of the background (no-toner) layer when printing from both normal and passthrough applications in a safe manner. First, the print driver 42 inserts the PostScript® instructions to implement the background layer at a particular point very early in the definition of each page, before any transformations have been applied which may affect the background layer. This also ensures that the entire contents of the page will be drawn on top of the background layer so it will not obscure any objects. Second, the exemplary print driver is configured to create a background layer 76 that is taller and wider than the largest media size supported by the printer, since the driver cannot reliably know the size of the media that will ultimately be used when printing the page.

Figure 9:
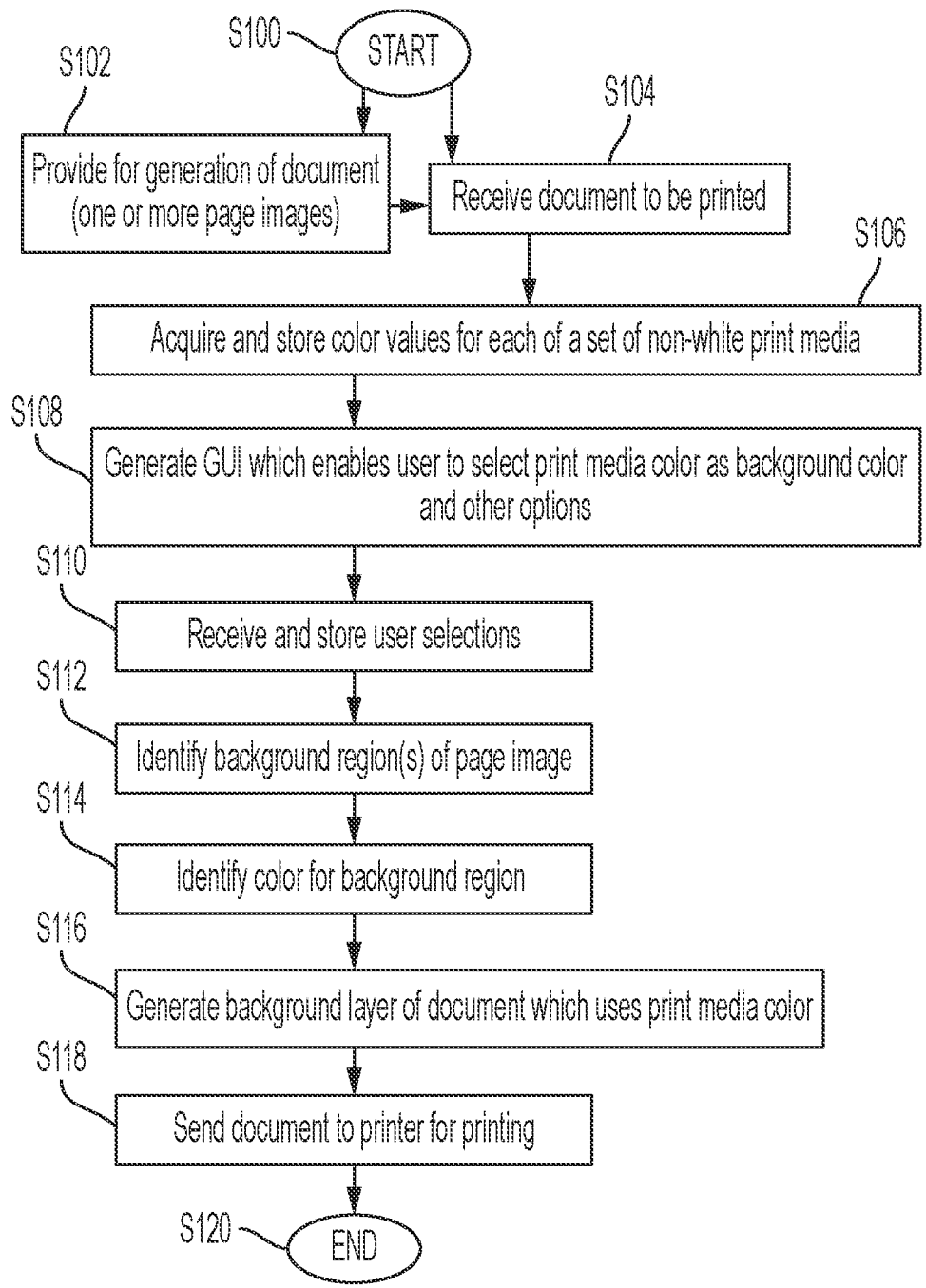
FIG. 9 illustrates an image processing method in accordance with another aspect of the exemplary embodiment.

With reference to FIG. 9, a method which may be performed using the system of FIGS. 1 and 2 is illustrated. The method begins at S100.

At S102, a document 12 to be printed is provided, e.g., created by a user in a document creation application, or is otherwise generated.

At S104, when a user selects to print the document, the document is received, e.g., by the print driver reception component 52.

At S106, color separation values are acquired, e.g., for three or more separations, such as RGB or CMYK, for each of a set of non-white print media, e.g., by the printer interface component 56. The color separation values may be acquired from the printer 16 or from another source and may be stored in memory 28, e.g., in the form of a look-up table (BLUT) 44. As will be appreciated, this step may be performed earlier in the method.

At S108, a graphical user interface 70 may be caused to be displayed to the user, e.g., on the display device 30, by the user interface generation component 54 of the print driver. The graphical user interface 70 provides a set of user selectable options, including an option for selecting a print media color and/or an option for a background layer corresponding to the print media color to be generated. While users would generally wish to select an adjustment setting 82 that most closely matches the actual color of their media, in some embodiments provision for selecting a different background color may be provided. For example, choosing grey offers a good compromise suitable for most colored media. In some embodiments, the background layer corresponding to the print media color is implemented automatically, by default. In some embodiments, when the user selects print, the background layer corresponding to the print media color is implemented automatically, by default, e.g., if a user has previously specified this option, without the need to display the GUI.

At S110, user selections, input via the user input device 38, or otherwise, are received, e.g., by the print driver reception component 52. These may include one or more of the following selections: a name of a print media color, selected from a set of predefined print media color names; a background adjustment, selected from a set of background adjustment options 82, such as those described with reference to FIG. 5; and a foreground adjustment, selected from a set of foreground adjustment options 84, such as those described with reference to FIG. 5.

At S112, when the user selects an option to use the print media color for rendering a background region, a background/foreground region, or regions 76 of each page image of the document may be identified, e.g., by the background region definition component 58. Regions 76 are open areas (i.e., where no pixel colors defined) which would normally be treated as solid white by the printer's PostScript® interpreter. In other embodiments, the print driver does not need to examine the content of the job to identify the open areas. It simply inserts the background layer and all transparent areas of the document naturally reveal the background layer.

At S114, a color for the background region 76 is identified, in a predefined color space, based on the user's selections at S112 (or defaults, where not specified). This may include accessing the BLUT 44 to identify the set of color separation values corresponding to a user-selected print media color name (or selected color patch). For example. If the user selects "adjust for green paper," the background color selection component 60 looks up the CMYK or RGB color separation values for the no-colorant color corresponding to the green paper. Additionally, or alternatively, this step may include, defining a foreground color or pattern, or the like, based on the user's selections.

At S116, a background and/or foreground layer 76 is added to the document 12, e.g., as a large filled rectangular vector object 76 that is inserted behind all of the text, vector graphics, and raster images that represent the content of a page. The driver implementation component 62 fills that background layer with the no-colorant color corresponding to the adjustment setting that the user has selected (e.g., adjust for green paper).

In place of a vector object, other methods of creating a background layer are also contemplated. In one embodiment, a single glyph, or a number of glyphs, may be used for filling the background, where the glyph may be solid rectangle rather than a pattern of on and off pixels such as a letter or an underscore, and the glyphs are drawn in the background color. In another embodiment, a single bitmap, or a series of small bitmaps tiled to fill the background, are used.

S116 may be performed before or after converting the document into a page description language interpretable by the printer, such as Postscript®. The background layer 76 may be uniformly filled with the color corresponding to the print media. If a foreground layer has been selected by a user, this may use the color corresponding to the print media as part of a pattern or image to fill the background region.

The print driver may also insert a command in the print job, instructing the printer controller 132 to use a color table 90 that is optimized for the print media color that the user selected.

At S118, the document, is output to the printer for printing.

At the printer, the PostScript® interpreter of the printer controller 132 recognizes those areas that are the same color as the selected print media color and instructs the printer to apply no colorant to locations on the print medium for which the color of the selected print medium is specified. In one embodiment, the printer accesses an MLUT 90 associated with the selected print media color for identifying colorant values for each of the color separation values specified in the page image. Each colorant value corresponds to a respective one of the set of colorants 138, 140, 142, 144, 146, available for printing. Each page image (that is not blank) is then rendered by the printer using one or more of these colorants.

The method ends at S120.

The method illustrated in FIG. 9 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30 (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive or independent disks (RAID) or other network server storage that is indirectly accessed by the computer 14, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 9, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The exemplary system and method allow users to print documents with a printer that would otherwise automatically provide a white background when printing on colored media. Users can easily insert a background layer filled with the no-colorant color corresponding to the selected media color. The automatic background layer overcomes the limitations of PostScript® regarding transparency and enables the media to show through in the document's transparent areas.

By selecting the media color within the print driver's user interface 70, optimizations specifically tailored for that color can also be implemented through the automating use of the appropriate MLUT 90. This can result in more vivid colors without the need for a complex color definition process by the user.

Users can also alternatively select a default setting, which automatically corrects the background color and which is expected to produce results that are acceptable to the user.

Another advantage is that users can use conventional vector-based document creation applications which support transparency. Users are able to leave areas transparent when they wish to apply no colorant and allow the media to show through, and optionally to apply a pattern or clear coat in (only) those regions.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An image processing system comprising:
    a reception component which receives a digital document page to be printed, the digital document page including a background region for which no color is specified;
    a background color selection component which provides for a user to select a print medium from a set of print media of different colors and select an option for a color of the selected print medium be used as a color of a background layer of the digital document page;
    a color implementation component which, when the option is selected, inserts the background layer into the digital document page to form a processed digital document page;

an output component which outputs a print job incorporating the processed digital document page to an associated printer that is configured to convert the color of the background layer to colorant values that use the print media as a colorant for rendering at least a part of the background region; and a processor which implements the reception components.

2. The system of claim 1, wherein the background layer is at least as large as the digital document page.

3. The system of claim 1, wherein the background layer defines a first layer of the processed digital document page.

4. The system of claim 1, wherein the color implementation component is configured to access a look up table which defines color separation values for each of a set of print media colors to identify color separation values for the selected print medium.

5. The system of claim 4, wherein the color implementation component fills a vector object with the color separation values for the selected print medium to generate the background layer.

6. The system of claim 1, further comprising a user interface component which generates a graphical user interface for display to the user on an associated display device for the user to select the print medium.

7. The system of claim 6, wherein the graphical user interface provides for the user to select from a plurality of options for generating the background layer, the plurality of options including the option for the color of the selected print medium be used as the color of the background layer and at least one other option selected from:
- a no background adjustment option, which implements the selection of a white colorant for rendering the background;
- a use white toner only option, which specifies that the page is rendered using white colorant only;
- an adjust for another print media color option, through which the user selects a color of a print medium other than the selected print medium be used as the color of the background layer;
- a default adjustment option, which automatically implements one of the other plurality of options by default;
- a no background fill option which allows the user to select a color for the background region;
- and combinations thereof.

8. The system of claim 1, wherein the background color selection component provides for the user to select a pattern or image to be used in the background region, the pattern or image being rendered, in part, using the print media color.

9. The system of claim 1, wherein the background color selection component provides an option for a user select a foreground colorant or pattern for rendering at least a part of the background region and wherein the color implementation component, when the option is selected, inserts a foreground layer, based on the selected foreground colorant or pattern, into the digital document page to form the processed digital document page.

10. The system of claim 9, wherein the foreground colorant comprises a clear colorant.

11. The system of claim 9, wherein the foreground layer comprises a pattern which uses the print media as a colorant for rendering a part of the pattern.

12. The system of claim 1, further comprising the printer.

13. The system of claim 12, wherein the printer has access to a set of look up tables, one for each of a set of print media of different colors.

14. The system of claim 9, wherein the printer includes a set of colorants, one of the colorants being a white colorant.

15. An image processing method comprising:
receiving a digital document page to be printed, the digital document page including a background region for which no color is specified;
providing an option for a user to select that a color of a selected print medium be used as a color of a background layer of the digital document page;
when the option is selected, inserting the background layer into the digital document page to form a processed digital document page; and
outputting a print job incorporating the processed digital document page to a printer that is configured to convert the color of the background layer to colorant values that use the print media as a colorant for rendering at least a part of the background region.

16. The method of claim 15, further comprising accessing a look up table which defines color separation values for each of a set of print media colors to identify color separation values for the selected print medium.

17. The method of claim 15, wherein the generation of the background layer comprises filling a vector object with color separation values for the selected print medium to generate the background layer.

18. The method of claim 15, wherein the providing of the option comprises generating a graphical user interface for display to the user on a display device for the user to select the print medium.

19. The method of claim 15, further comprising providing for the user to select at least one of:
- a pattern or image to be used in the background region, the pattern or image being rendered, in part, using the print media color;
- a foreground colorant to be used in a foreground layer over the background region.

20. The method of claim 15, further comprising printing the processed digital document with the printer.

21. The method of claim 20, wherein the printing includes accessing one of a plurality of look up tables to convert color values for the processed page image to colorant values, each of the plurality of look up tables being associated in memory with a respective print media color.

22. An image processing method comprising:
receiving a digital document page to be printed, the digital document page including a background region for which no color is specified;
receiving a user's selection of a print media color to be used in rendering the digital document page;
providing for the user to select that a color of the selected print medium be used as a color of at least a part of a background layer of the digital document page;
optionally, providing for a user to select a foreground colorant to be applied over at least a part of the background layer;
forming a processed digital document page including inserting a background layer into the digital document page with the color of the selected print medium; and
converting colors of the digital document page to colorant values used in printing, the conversion of the color of the selected print medium to colorant values resulting in no colorant being applied to the print medium in locations for which the color of the selected print medium is specified unless the user has selected a foreground colorant.

* * * * *